(12) United States Patent
Kjellström

(10) Patent No.: US 11,841,211 B2
(45) Date of Patent: Dec. 12, 2023

(54) METHOD FOR FIRE CONTROL OF AN ANTI-AIRCRAFT GUN

(71) Applicant: BAE SYSTEMS BOFORS AB, Karlskoga (SE)

(72) Inventor: Hendric Kjellström, Skärblacka (SE)

(73) Assignee: BAE SYSTEMS BOFORS AB, Karlskoga (SE)

( * ) Notice: Subject to any disclaimer, the term of this patent is extended or adjusted under 35 U.S.C. 154(b) by 0 days.

(21) Appl. No.: 17/799,702

(22) PCT Filed: Jan. 22, 2021

(86) PCT No.: PCT/SE2021/050038
§ 371 (c)(1),
(2) Date: Aug. 15, 2022

(87) PCT Pub. No.: WO2021/167510
PCT Pub. Date: Aug. 26, 2021

(65) Prior Publication Data
US 2023/0085526 A1 Mar. 16, 2023

(30) Foreign Application Priority Data
Feb. 17, 2020 (SE) .................... 2000032-9

(51) Int. Cl.
*F41G 5/08* (2006.01)
*F41G 3/04* (2006.01)
(Continued)

(52) U.S. Cl.
CPC ............. *F41G 5/08* (2013.01); *F41G 3/04* (2013.01); *F41G 3/065* (2013.01); *F41H 11/02* (2013.01); *G01S 13/06* (2013.01)

(58) Field of Classification Search
CPC ... F41G 5/08; F41G 3/04; F41G 3/065; F41H 11/02; G01S 13/06
See application file for complete search history.

(56) References Cited

U.S. PATENT DOCUMENTS 7,205,520 B1 * 4/2007 Busse .................... G01S 3/784
250/203.6
9,711,851 B1 * 7/2017 Cesarano ............ H04B 7/0617
(Continued)

FOREIGN PATENT DOCUMENTS

EP 1610152 A1 12/2005
EP 2150836 B1 * 11/2015 ............... F41G 5/08
(Continued)

OTHER PUBLICATIONS

International Search Report (dated Dec. 3, 2021) for corresponding International App. PCT/SE2021/050038.

*Primary Examiner* — Tuyen K Vo
(74) *Attorney, Agent, or Firm* — WRB-IP PLLC

(57) ABSTRACT

A fire control method against aerial targets flying toward a protection object when the position of the protection object is known includes measuring the position of the aerial target, estimating the position of the aerial target, estimating the velocity of the aerial target, predicting the future path of the aerial target from the estimated position of the aerial target and the estimated velocity of the aerial target, and deciding, on the basis of the predicted path, whether the aerial target i.) is incoming and thus a threat against the protection object, ii.) is passing by and thus not a threat to the protection object.

5 Claims, 3 Drawing Sheets

(51) Int. Cl.
*F41H 11/02* (2006.01)
*G01S 13/06* (2006.01)
*F41G 3/06* (2006.01)

(56) References Cited

U.S. PATENT DOCUMENTS

| | | |
|---|---|---|
| 2005/0115450 A1 | 6/2005 | Lloyd et al. |
| 2006/0097102 A1* | 5/2006 | Chang ............... F41H 5/007 |
| | | 244/3.1 |
| 2010/0026554 A1 | 2/2010 | Longman et al. |
| 2011/0029234 A1* | 2/2011 | Desai ............... G01C 21/20 |
| | | 701/467 |
| 2016/0178331 A1* | 6/2016 | Sharpin ............... F41G 7/34 |
| | | 235/404 |
| 2017/0059692 A1* | 3/2017 | Laufer ............... F41G 7/2253 |
| 2020/0072582 A1* | 3/2020 | Factor ............... H01S 5/4012 |
| 2020/0108926 A1* | 4/2020 | Smith ............... B64F 1/007 |
| 2020/0166311 A1* | 5/2020 | Kolanek ............... G05D 1/106 |
| 2022/0034633 A1* | 2/2022 | Yeshurun ............... G06N 20/00 |

FOREIGN PATENT DOCUMENTS

| | | | |
|---|---|---|---|
| GB | 2107834 | A | 5/1983 |
| SE | 538155 | C2 | 3/2016 |

\* cited by examiner

METHOD FOR FIRE CONTROL OF AN ANTI-AIRCRAFT GUN

BACKGROUND AND SUMMARY

The present patent application relates to a method for fire control of anti-aircraft weapons, which are to defend an object having known positions, using guided or unguided ammunition, against attack using guided armed aircraft.

To engage a movable airborne aerial target using unguided projectiles fired from anti-aircraft weapons, the projectiles must be fired against points where the aerial target will be located when reached by the projectiles. Such points, normally referred to as set-forward points, must be predicted. In this context, prediction is an estimate of the aerial target's position at a point in time in the near future. The estimate is based on knowing the previous positions of the aerial target and on a hypothesis about its expected future behavior.

An estimate of the aerial target's current position and movement behavior based on a continuous data flow from an ongoing measurement of the aerial target's position is referred to as target data estimate.

Estimation and prediction take place simultaneously, at least until the start of an engagement process. At least one sensor is used to follow and measure the aerial target's position. Based on the measured data from this sensor, the current position and velocity of the aerial target are estimated. On the basis of estimate and hypothesis, a predictor then calculates the direction in which the firing weapon is to be pointed. An example of a method and a device for fire control against aircraft is given in patent EP0527715 A1, where a prediction hypothesis is made that the path of an aircraft can be described by one of a few simple geometric models. No assessment is made of whether the aircraft is passing by or is incoming.

An example of the method for fire control against aircraft is also provided in patent SE1330063 A1, where a method is shown for improving the prediction of the aircraft's path through the knowledge about the protection object against which the aircraft is moving. No assessment is made of whether the aircraft is passing by or is incoming.

The problem with the current proposals according to the above-mentioned documents is therefore that an attacking armed aircraft heading toward its target cannot in general be described using a simple geometric model. Therefore, the set-forward points of the aerial target predicted based on an erroneous hypothesis about its future path will, of course, also be erroneous.

Other problems to be solved by the present invention are detailed in the description of the different embodiments provided below.

It is desirable to improve the capability of calculating the correct set-forward points when an anti aircraft weapon is used to defend an object against attacking guided armed aircraft. This may be achieved by calculating the paths an attacking aircraft may follow.

The present invention, according to an aspect thereof, provides a method for fire control against an aerial target heading toward a protection object when the position of the protection object is known, the method including the following steps: measuring the position of the aerial target, estimating the position of the aerial target, estimating the velocity of the aerial target, predicting the future path of the aerial target from the estimated position of the aerial target and the estimated velocity of the aerial target, decide, from the predicted path, whether the aerial target i.) is incoming and therefore a threat to the protection object ii.) is passing by, and therefore not a threat to the protection object.

According to other aspects of the method for fire control against aerial targets, when the aerial target is assessed to be incoming, the following method steps are performed:
set up a model for the guidance of the aerial target,
calculate the accelerations to be set by the aerial target to meet the protection object,
predict the future path of the aerial target from the position of the protection object, the estimated position of the aerial target, the estimated velocity of the aerial target, the calculated acceleration of the aerial target,
calculate the set-forward points along the predicted path.

Guidance of the aerial target includes navigation constants calculated by multiplying the observed acceleration by the predicted time before reaching the protection object squared divided by the distance from the aerial target to the protection object.

The guidance of the aerial target includes a maximum acceleration, whose magnitude is estimated via analysis of the observed accelerations of the aerial target.

When the aerial target is assessed to be passing by, the following method steps are performed: set a model of the guidance of the aerial target according to $x(t)=p_{0x}+v_{0x}t+a_{0x}t^2/2$, predict the future path of the aerial target from the estimated position of the aerial target, the estimated velocity of the aerial target, the calculated acceleration of the aerial target, calculate the set-forward points along the predicted path.

The invention further includes, according to aspects thereof, a fire control system for fire control against aerial targets, including at least one sensor for measuring the position of the aerial target as a function of time.

The advantage of aspects of the present invention is that the calculated set-forward points make it possible to point the weapon so that the preferably unguided projectiles, which are launched when firing, are so close to the attacking aircraft that an effect is achieved.

BRIEF DESCRIPTION OF THE DRAWINGS

The invention is described in the following in greater detail with reference to the attached figures.

DETAILED DESCRIPTION

An attacking guided aircraft referred to hereinafter as aerial target, intends to harm an attack target, referred to hereinafter as protection object. Engaging the aerial target means acting upon the aerial target so that it can no longer harm the protection object, against which the aerial target is deployed, for example, by the fact that the target object is hit by shrapnel. A system designed to engage aerial targets with the aid of firearms and unguided projectiles may be considered to include three parts: fire control, weapon, and projectiles. Hereinafter such a system will be referred to as anti-aircraft weapon. Unguided projectiles mean different forms of projectiles, as well as grenades and rockets intended to be used for engaging aerial targets.

A fire control included in an anti-aircraft weapon has one or more sensors and a plurality of methods for handling and evaluating sensor data. The sensor or sensors included in and used by the fire control are hereinafter referred to as sight. Refined information from the sight is used for controlling the aim of both sight and weapon.

Figure 1:
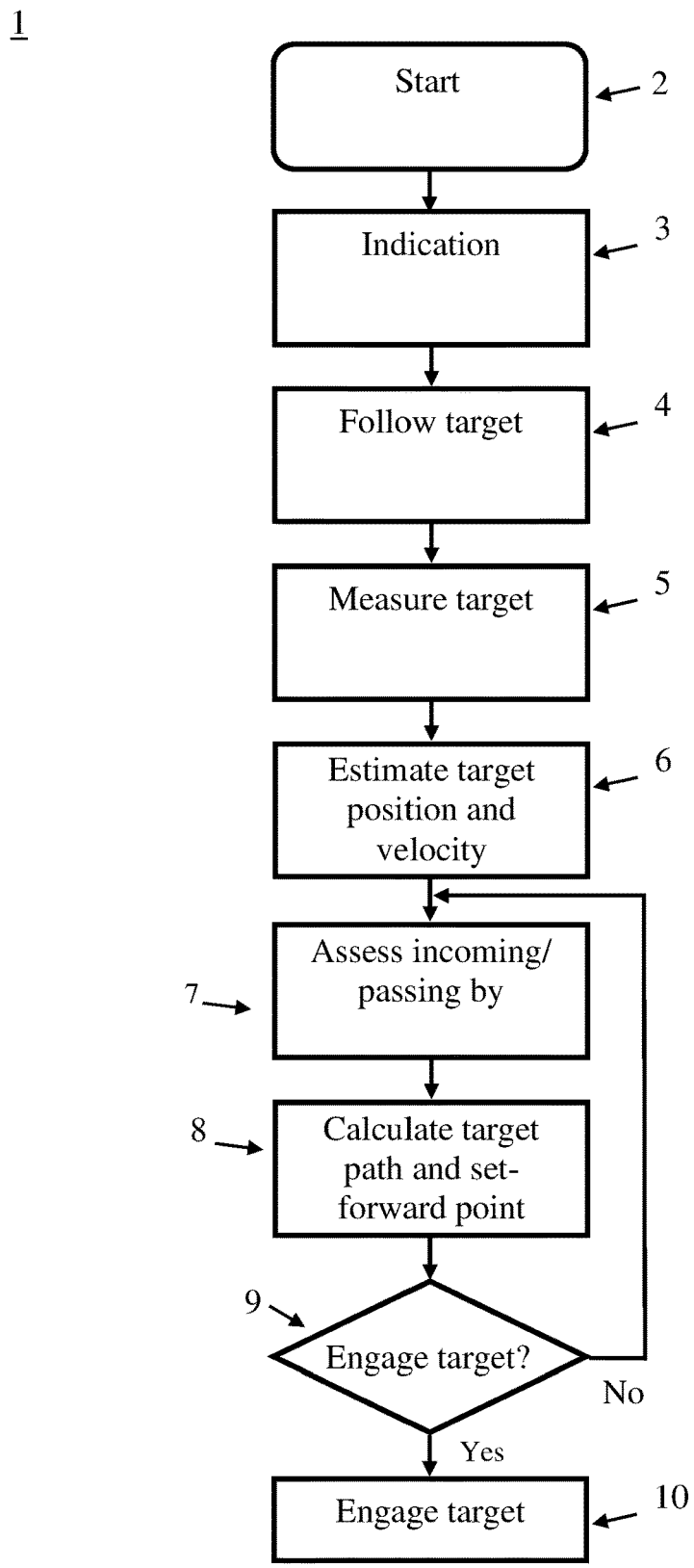
FIG. 1 shows a flow chart of the method for fire control against aerial targets according to one embodiment of the invention.

Engagement can be considered to include a number of activities, some of which may be performed sequentially, while others may be performed simultaneously. FIG. 1 shows a flow chart of a method in a fire control system 1, When engagement is initiated, start 2 in FIG. 1, the sight is aimed toward an aerial target to be engaged. This is usually made possible by an external unit, for example, a reconnaissance radar, delivering information on an ongoing basis about the position of the aerial object as a function of time. This external unit is known as indicating unit. The method is known as indication 3. While the sight is pointed at the aerial target, the barrel can be pointed at a previously calculated set-forward point, whose position is based on data from the indicating unit. In this way the time needed for pointing the barrel when a more accurate set-forward point has been calculated is reduced, since the pre-calculated set-forward point will be close to the more accurate set-forward point calculated later.

Complete indication means that the sight is capable of measuring the position of the aerial target by itself. It is, however not guaranteed that the sight is capable of directly detecting the aerial target although it is correctly aimed.

Since the aerial target is getting closer and closer, the likelihood of the sight being capable of detecting the aerial target increases. When this event occurs, it is known as target capture. Target capture is the start of a new sequence known as Target following 4. The sight then guides its own line of sight, so that the line of sight follows the aerial target.

When target following 4 has been established, target measurement 5 is started. The sight now attempts to measure both direction and distance to the aerial target. It is not guaranteed that the sight is capable of directly measuring the distance to the aerial target when target measurement 5 is started. However, sooner or later the sight will begin to deliver distance data. In the meantime, the position of the aerial target and the preliminary set-forward point can be calculated by combining the angle data from the sight and the distance data from the indicating unit.

When the sight can finally generate both direction data and distance data, no more indication data are needed for guiding sight and barrel. However, indication data may be used for other purposes.

When the sight measures the position of the aerial target during target measurement 5, this is usually accomplished at a higher frequency and higher accuracy than what the indicating sensor is capable of. This is the main reason for using two types of sensors, reconnaissance sensors and fire control sensors.

The coefficients of three polynomials are adjusted to the measured data. These polynomials together describe the position of the aerial target as a function of time. The degree of the polynomials must be selected according to the aspect of the raw data. In the following examples a second-degree polynomial has been selected.

$$x(t)=p_{0x}+v_{0x}t+a_{0x}t^2/2 \quad (1)$$

$$y(t)=p_{0y}+v_{0y}t+a_{0y}t^2/2 \quad (2)$$

$$z(t)=p_{0z}+v_{0z}t+a_{0z}t^2/2 \quad (3)$$

The coefficients of the polynomials, i.e., vectors $p_0$, $v_0$, and $a_0$, may be adjusted to these measured data using, for example, the least squares method, $p_0$ here means the current position, $v_0$ the current velocity, and $a_0$ the current acceleration. Other methods or techniques for adjusting the measured data may also be used. Before adjusting the measured data, the outliers may be removed from the time window. When the coefficients of the polynomials have been calculated, the polynomials may be used for calculating the estimated position of the aerial target at a certain point in time.

The polynomials may be derived once, which may similarly be used for estimating the velocity of the aerial target at a certain point in time.

$$v_x(t)=v_{0x}+a_{0x}t \quad (4)$$

$$v_y(t)=v_{0y}+a_{0y}t \quad (5)$$

$$v_z(t)=v_{0z}+a_{0z}t \quad (6)$$

Furthermore, derivation provides an estimate of the (here constant) acceleration of the aerial target.

$$a_x(t)=a_{0x} \quad (7)$$

$$a_y(t)=a_{0y} \quad (8)$$

$$a_z(t)=a_{0z} \quad (9)$$

Polynomials should not be used for estimating position, velocity or acceleration at points in time outside the time window used for calculating the coefficients of the polynomials. One necessary exception is the waiting time for the next batch of raw data from the sight. During this time the polynomial can be reasonably used for calculating the current position and velocity. As soon as new raw data arrive from the sight, the procedure is repeated, and new polynomial coefficients are obtained.

By applying the above-described procedure, every time new measured data becomes available, the acceleration set by the aerial target may be observed or calculated. Depending on the behavior of the aerial target, such observations may sometimes be used for estimating the maximum acceleration the aerial target is capable of. The length of the time window used is dynamically adjusted. If the measuring accuracy is low, the measured data contains noise and a long window containing many data points is preferred. If the aerial target performs quick maneuvers, changing its movement profile at a high rate, a shorter window is preferable. Based on the information in the raw data, a suitable window length may thus be dynamically and adaptively calculated for any given situation.

A common prediction hypothesis is that the aerial target will continue to move from its current position at its current velocity without any acceleration. In this case, the aerial target will travel along a straight-line path at constant speed. The set-forward point is a point on this line that is characterized by the aerial target and a projectile fired needing exactly the same time to reach it. The set-forward point is thus the only point where the aerial target can be engaged.

Another prediction hypothesis is that the aerial target will continue to move from its current position and with its current acceleration (which is assumed to be constant in absolute value but locked in direction in relation to the coordinate system relative to the body of the aerial target). In this case the aerial target will move along a path whose shape is determined by the direction of the acceleration with respect to the coordinate system relative to the body of the aerial target and by the way this coordinate system rotates.

Except for the fact that the path can now be curved and the movement of the aerial target no longer needs to be constant, the same can be said as above regarding the position of the set-forward point.

Another prediction hypothesis uses the knowledge of the position of the protection object, which the aerial target intends to hit, in which case the path of the aerial target can be predicted with a higher accuracy. This procedure is described in detail in SE1330063 A1.

In the incoming/passing by 7 assessment step, an assessment is made of whether the aerial target is considered incoming or passing by. In the case where the aerial target is passing by, a prediction hypothesis is selected in accordance with a second degree polynomial shown in formulas (1), (2), (3) above. In the case where the aerial target is assessed to be incoming, the prediction hypothesis including the presumption that the aerial target is heading toward the position of the protection object is used.

A set-forward point can then be predicted in the step Calculate target path and set-forward point 8.

When the set-forward point is calculated, a decision can be made of whether the aerial target should be engaged in the step Engage target? 9. If so, the target is engaged in step Engage target 10, preferably using a barrel-based weapon.

Figure 2:
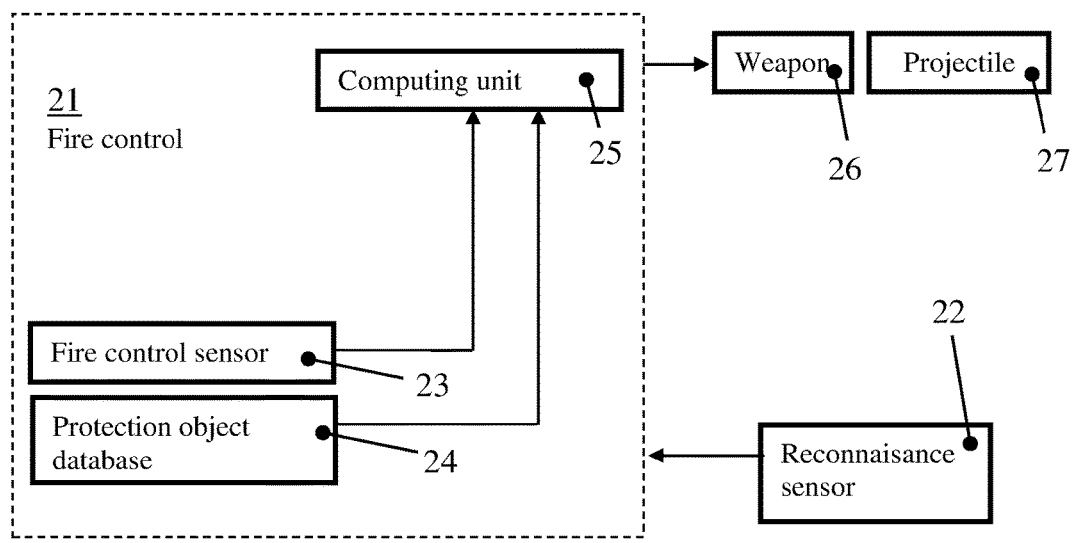
FIG. 2 shows a block diagram of the device for engaging an aerial target according to one embodiment of the invention.

It is now neither necessary nor desirable to always open fire as soon as possible. Rather, it may be advantageous to wait and check whether the aerial target does in fact pass through the predicted set-forward points at the predicted points in time. In fact, it is perfectly possible to simultaneously predict more than one target path. A number of different paths may thus be predicted, all according to the above description, for a number of navigation constants (e.g., 3, 4, 5, 6, 7) and then to compare the predicted paths with the path actually observed. In this way it can be decided which navigation constant the aerial target is believed to make use of and it thus becomes known which of the predicted target paths is the most correct one. An anti-aircraft weapon system 20 shown in FIG. 2 includes a fire control 21, one or more weapons 26 and projectiles 27, which can be fired against aerial targets. System 20 receives indication from some external reconnaissance sensor 22, which is capable of surveying very large volumes in a great depth at the expense of accuracy and measuring frequency. Anti-aircraft weapon system 20 includes a fire control sensor 23, which, after indication, can pinpoint the position of the individual aerial target in a small sector in a limited depth but high accuracy and high measuring frequency. Computing unit 25 is used for calculating the set-forward points to which weapon 26 is to be pointed. Fire control 21 may also include a database 24 of protection objects, containing positions of a plurality of such objects that may be in the area around anti-aircraft weapon system 20.

Figure 3:
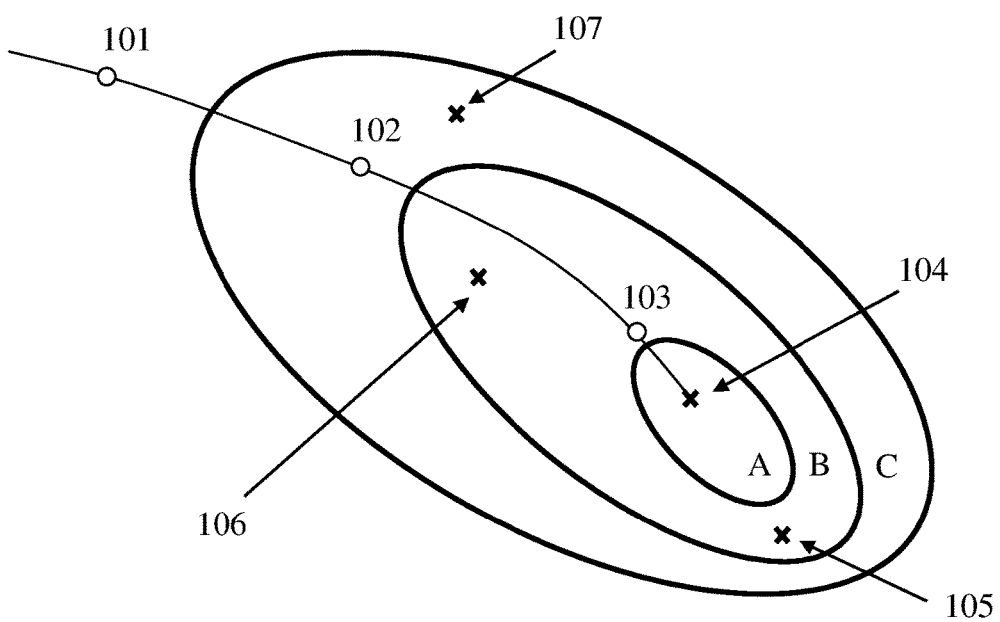
FIG. 3 shows the target area of an aerial target according to one embodiment of the invention.
Figure 4:
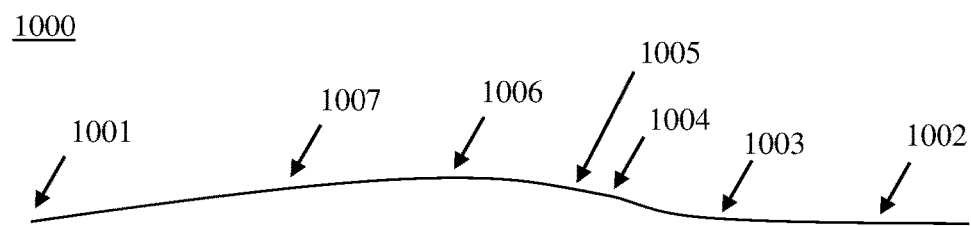
FIG. 4 shows the path of an aerial target according to one embodiment of the invention.

FIG. 3 shows a target area 100 for an aerial target heading toward one of several protection objects. As the aerial target approaches protection object 104, it will pass by several protection objects 105, 106, 107 or find itself outside the area toward which it can navigate. At point 101, the aerial tartlet can be guided toward all protection objects 104, 105, 106, 107 within target area C. As the aerial target continues moving toward the protection object, after a certain time period it will reach point 102, where all protection objects 104, 105, 106 within target area B can be engaged by the aerial target. The aerial target then continues to point 103, target area A, where protection objects 105 and 106 can no longer be engaged, and therefore only protection object 104 can be engaged. It thus becomes clear that the actual destination of the aerial target is protection object 104. As the actual protection object has now been identified, the set-forward points can be calculated with greater confidence. FIG. 4 shows path 1000 of an aerial target toward a protection object 1001. The aerial target is flying toward protection object 1001. The aerial target is detected by a reconnaissance sensor when it passes by point 1002. The reconnaissance sensor then activates a fire control sensor. At some point between points 1002 and 1003, the fire control sensor finds the aerial target and starts following and measuring the position and velocity of the aerial target. At point 1003 the aerial target may initiate a course correction, for example, to detect protection object 1001. At point 1004, the course correction of the aerial target is completed. At point 1005, the aerial target begins to follow a guidance that attempts to guide the aircraft toward protection object 1001. When the aerial target passes by point 1006, the fire control can begin to predict set-forward point 1007. The prediction is based on data from the fire control sensor and a hypothesis about the guidance used by the aerial target.

The invention is not limited to the specific embodiments described herein, but can be varied in different ways within the scope of the patent claims.

For example, the number of transmitters, firing devices or system of elements and details included in the method for fire control against the guided aerial target is adapted to weapons system(s), platform(s), and other design features present in the given case. The above-described method for fire control against guided aerial targets may be adapted in principle to any guided aircraft and systems including airplanes, unmanned aircraft and missiles.

The invention claimed is:

1. A method for fire control against aerial targets flying toward a protection object, wherein the position of the protection object is known, the method comprising:
    measuring a measured position of the aerial target,
    estimating a velocity of the aerial target,
    estimating an estimated position of the aerial target,
    predicting a future path of the aerial target from the estimated position of the aerial target and the estimated velocity of the aerial target,
    selecting, from the predicted path, whether the aerial target
        i.) is incoming and thus a threat against the protection object,
        ii.) is passing by and thus not a threat against the protection object, and
    after selecting that the aerial target is incoming:
    setting a model for guidance of the incoming aerial target,
    calculating accelerations to be set by the incoming aerial target to reach the protection object,
    estimating an estimated position of the incoming aerial target,
    predicting a future path of the incoming aerial target from the position of the protection object, the estimated position of the aerial target, the estimated velocity of the aerial target, and the calculated acceleration of the incoming aerial target,
    calculating set-forward points along the predicted path.

2. The method for fire control against aerial targets flying toward a protection object according to claim 1, wherein the guidance of the aerial target includes navigation constants calculated by multiplying the observed acceleration by the predicted time until contact with the protection object squared, divided by the distance from the aerial target to the protection object.

3. The method for fire control against aerial targets according to claim 1, wherein the guidance of the aerial target includes a maximum acceleration, whose magnitude is estimated by analyzing the observed accelerations of the aerial target.

4. The method for fire control against aerial targets flying toward a protection object according to claim 1, wherein the model for the guidance of the aerial target is set according to $x(t) = p_{0x} + v_{0x}t + a_{0x}t^2/2,$ $y(t) = p_{0y} + v_{0y}t + a_{0y}t^2/2,$ $z(t) = p_{0z} + v_{0z}t + a_{0z}t^2/2,$ predicting a future path of the incoming aerial target from the estimated position of the aerial target, the estimated velocity of the aerial target, the calculated acceleration of the incoming aerial target, calculating set-forward points along the predicted path.

5. A fire control system for fire control against aerial targets including at least one sensor for measuring the position of the aerial target as a function of time, wherein the system applies the fire control method according to claim 1.

\* \* \* \* \*